United States Patent [19]
Kato et al.

[11] Patent Number: 6,026,640
[45] Date of Patent: Feb. 22, 2000

[54] METHOD OF CONTROLLING AN ENGINE EXHAUST GAS SYSTEM AND METHOD OF DETECTING DETERIORATION OF CATALYST/ADSORBING MEANS

[75] Inventors: Nobuhide Kato, Ama-gun; Hiroshi Kurachi, Nagoya, both of Japan

[73] Assignee: NGK Insulators, Ltd., Japan

[21] Appl. No.: 09/315,358

[22] Filed: May 17, 1999

Related U.S. Application Data

[63] Continuation of application No. 08/876,285, Jun. 16, 1997, Pat. No. 5,953,907.

[30] Foreign Application Priority Data

Jun. 21, 1996 [JP] Japan ................................. 8-161219
May 28, 1997 [JP] Japan ................................. 9-139022

[51] Int. Cl.$^7$ ............................. F01N 3/20; F02D 41/14
[52] U.S. Cl. ............................. 60/274; 60/276; 60/277; 60/285; 60/286; 60/297
[58] Field of Search ............................. 60/274, 276, 277, 60/285, 286, 297, 301, 311

[56] References Cited

U.S. PATENT DOCUMENTS

| | | | |
|---|---|---|---|
| 5,410,873 | 5/1995 | Tashiro ........................................ | 60/276 |
| 5,483,795 | 1/1996 | Katoh et al. ................................. | 60/276 |
| 5,713,199 | 2/1998 | Takeshima et al. ......................... | 60/276 |
| 5,715,679 | 2/1998 | Asanuma et al. ........................... | 60/276 |
| 5,735,119 | 4/1998 | Asanuma et al. ........................... | 60/276 |
| 5,771,686 | 6/1998 | Pischinger et al. ......................... | 60/274 |

OTHER PUBLICATIONS

"Evaluation of NOx Storage Catalysts as an Effective System for NOx Removal from the Exhaust Gas of Leanburn Gasoline Engines"; M.S. Brogan et al.

*Primary Examiner*—Tony M. Argenbright
*Attorney, Agent, or Firm*—Parkhurst & Wendel, L.L.P.

[57] ABSTRACT

In a method of controlling an exhaust gas system of an internal combustion engine including a nitrogen oxide reducing catalyst capable of adsorbing nitrogen oxide under a lean atmosphere and a nitrogen oxide sensor disposed downstream of the nitrogen oxide reducing catalyst, the nitrogen oxide reducing catalyst and the nitrogen oxide sensor are disposed in the exhaust gas system operated mainly under a lean condition, respectively. An output value of the nitrogen oxide sensor is compared with a predetermined value, and an operation condition of the internal combustion engine is temporarily changed into a stoichiometric condition or a rich condition, or a fuel is injected upstream of the nitrogen oxide reducing catalyst, so that the nitrogen oxide adsorbed to the nitrogen oxide reducing catalyst is detached or decomposed, and again the internal combustion engine is operated under the lean condition.

6 Claims, 7 Drawing Sheets

METHOD OF CONTROLLING AN ENGINE EXHAUST GAS SYSTEM AND METHOD OF DETECTING DETERIORATION OF CATALYST/ADSORBING MEANS

This is a continuation of application Ser. No. 08/876,285 filed Jun. 16, 1997, now U.S. Pat. No. 5,953,907.

BACKGROUND OF THE INVENTION AND RELATED ART STATEMENT

The present invention relates to a method of controlling an engine exhaust gas system which can efficiently remove nitrogen oxide in the exhaust gas of a lean burn engine by using a nitrogen oxide sensor and a nitrogen oxide adsorbing means when the nitrogen oxide contained in the exhaust gas of an internal combustion engine is treated, and to a method of detecting the deterioration of a catalyst/adsorbing means used in the former controlling method.

Conventionally, a method is disclosed, in which nitrogen oxide (hereinafter referred to as NOx) is adsorbed to a three-way catalyst disposed in an exhaust system in a lean burn engine, and the NOx is released and reduced by intermittently flowing stoichiometric or rich exhaust gas to the adsorbed nitrogen oxide, for example, in a U.S. Society of Automotive Engineers paper (SAE paper) 952490.

However, in this system, since whether the exhaust gas is made stoichiometric or rich, or the timing of fuel injection and the amount of injection are set values in accordance with driving conditions, inaccuracy can not be avoided such that for the actual adsorption a mount of NOx, the timing of injection is too early or too late, or the amount of injection is too large or too small. Thus, the system has such disadvantages that if the timing of injection is too early, fuel efficiency is lowered, and if the timing is too late, a large amount of NOx is exhausted. Further, when an NOx catalyst is deteriorated, a large amount of NOx is exhausted, however, there has been no high reliable method of detecting the deterioration thereof.

SUMMARY OF THE INVENTION

The present invention has been made to eliminate the above described disadvantages of the conventional method, and has an object to provide a method of controlling an engine exhaust gas system in which nitrogen oxide in the exhaust gas of an internal combustion engine can be efficiently treated to a low concentration, and a method of accurately detecting the deterioration of a catalyst/adsorbing means used in the controlling method.

According to the present invention, there is provided a method of controlling an exhaust gas system of an internal combustion engine including a nitrogen oxide reducing catalyst capable of adsorbing nitrogen oxide under a lean atmosphere and a nitrogen oxide sensor disposed downstream of the nitrogen oxide reducing catalyst, the nitrogen oxide reducing catalyst and the nitrogen oxide sensor being disposed in the exhaust gas system operated mainly under a lean condition, respectively, wherein an output value of said nitrogen oxide sensor is compared with a predetermined value, and an operation condition of said internal combustion engine is temporarily changed into a stoichiometric condition or a rich condition so that the nitrogen oxide adsorbed to said nitrogen oxide reducing catalyst is detached or decomposed, and again said internal combustion engine is operated under the lean condition.

Also, according to the present invention, there is provided a method of controlling an exhaust gas system of an internal combustion engine including a nitrogen oxide reducing catalyst capable of adsorbing nitrogen oxide under a lean atmosphere and a nitrogen oxide sensor disposed downstream of the nitrogen oxide reducing catalyst, the nitrogen oxide reducing catalyst and the nitrogen oxide sensor being disposed in the exhaust gas system operated mainly under a lean condition, respectively, wherein an output value of said nitrogen oxide sensor is compared with a predetermined value, and a fuel is injected upstream of said nitrogen oxide reducing catalyst so that the nitrogen oxide adsorbed to said nitrogen oxide reducing catalyst is detached or decomposed, and again said internal combustion engine is operated under the lean condition.

Further, according to the present invention, there is provided a method of controlling an exhaust gas system of an internal combustion engine including an adsorbing means capable of adsorbing nitrogen oxide under a lean atmosphere, a nitrogen oxide reducing catalyst disposed downstream of the adsorbing means or integrally with the adsorbing means, and a nitrogen oxide sensor disposed downstream of the adsorbing means, the adsorbing means, the nitrogen oxide reducing catalyst and the nitrogen oxide sensor being disposed in the exhaust gas system operated mainly under a lean condition, respectively, wherein an output value of said nitrogen oxide sensor is compared with a predetermined value, and the operation condition of said internal combustion engine is temporarily made stoichiometric or rich so that the nitrogen oxide adsorbed to said adsorbing means is detached or decomposed, and again said internal combustion engine is operated under the lean condition.

Still further, according to the present invention, there is provided a method of controlling an exhaust gas system of an internal combustion engine including an adsorbing means capable of adsorbing nitrogen oxide under a lean atmosphere, a nitrogen oxide reducing catalyst disposed downstream of the adsorbing means or integrally with the adsorbing means, and a nitrogen oxide sensor disposed downstream of the adsorbing means, the adsorbing means, the nitrogen oxide reducing catalyst and the nitrogen oxide sensor being disposed in the exhaust gas system operated mainly under a lean condition, respectively, wherein an output value of said nitrogen oxide sensor is compared with a predetermined value, and a fuel is injected upstream of said adsorbing means so that the nitrogen oxide adsorbed to said adsorbing means is detached or decomposed, and again said internal combustion engine is operated under the lean condition.

Further, according to the present invention, there is provided a method of detecting deterioration, characterized in that in the above-mentioned method of controlling an exhaust gas system of an internal combustion engine, deterioration of said nitrogen oxide reducing catalyst or said adsorbing means is detected based on the output value of said nitrogen oxide sensor in any step, a period of time of continuation of a lean condition, or a repetition period of the lean condition and a rich condition.

According to this method of detecting the deterioration, even if the capacity of the nitrogen oxide reducing catalyst is not uniform or is changed with the lapse of time during the use, the timing when the engine exhaust gas is made stoichiometric or rich, and the timing when a condition is returned to the lean condition, can be accurately detected so that the above-mentioned control method is made more efficient, the engine is operated under the condition that the NOx exhaust amount is accurately controlled, and the deterioration of the catalyst can be accurately detected.

Here, the nitrogen oxide reducing catalyst is a catalyst which adsorbs nitrogen oxide and reduces or decomposes NOx gas on the adsorbing catalyst surface portion into $N_2$ and $O_2$.

PREFERRED EMBODIMENT OF THE INVENTION.

Figure 1:
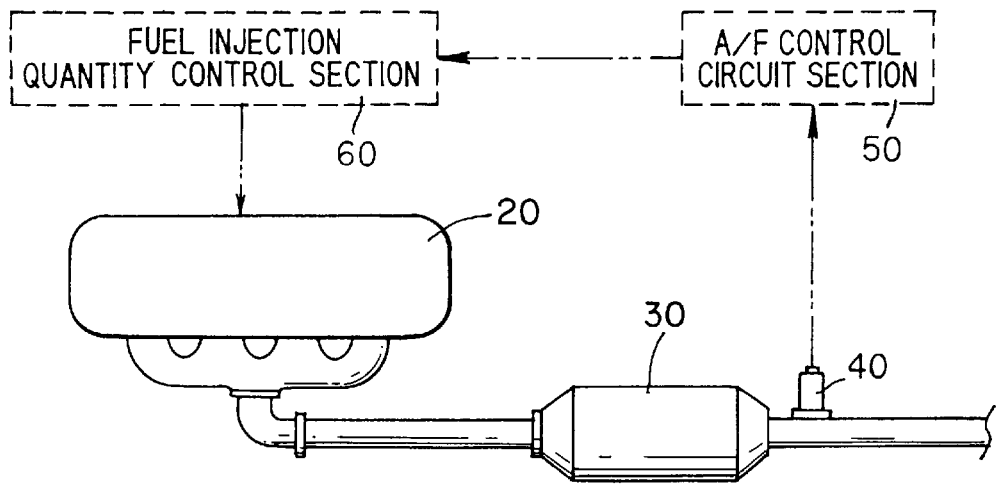
FIG. 1 is an explanatory view showing an embodiment of a method of controlling an engine exhaust gas system according to the present invention.
Figure 2:
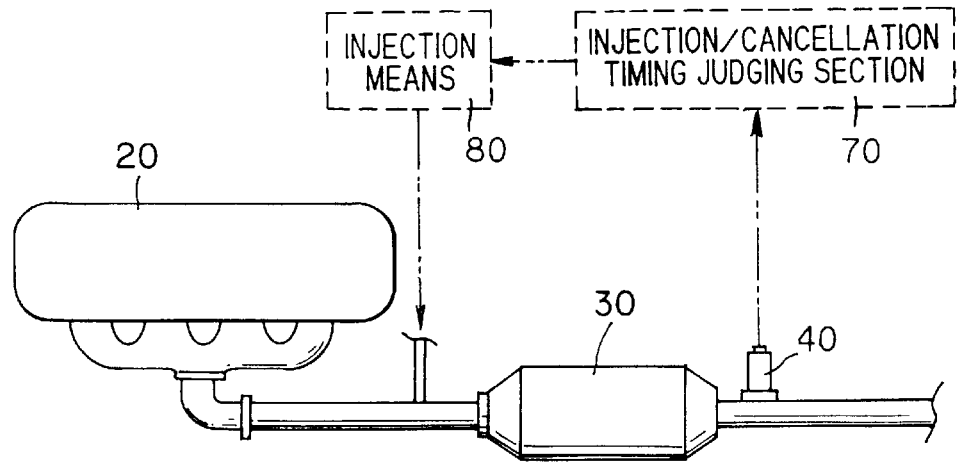
FIG. 2 is an explanatory view showing another embodiment of a method of controlling an engine exhaust gas system according to the present invention.
Figure 3:
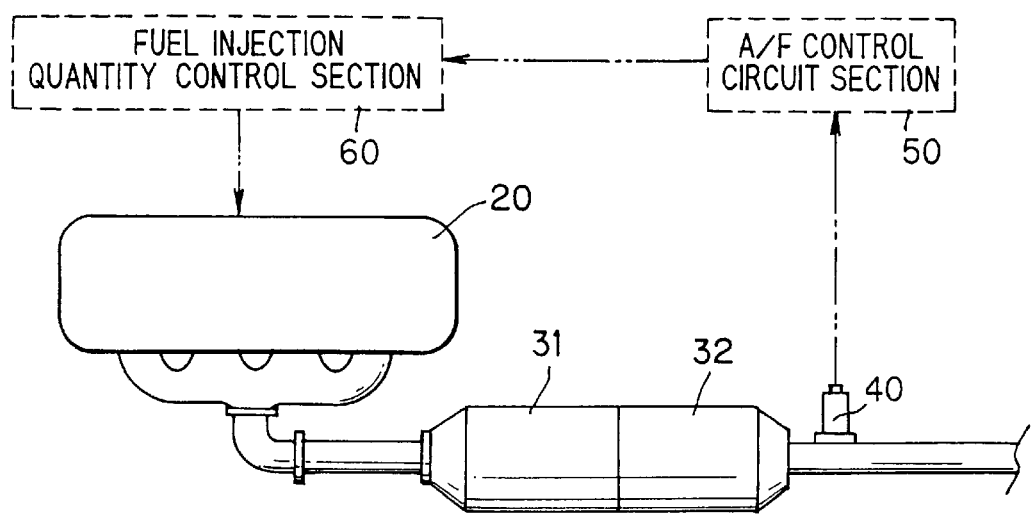
FIG. 3 is an explanatory view showing still another embodiment of a method of controlling an engine exhaust gas system according to the present invention.

FIGS. 1 to 3 are explanatory views showing a method of controlling an exhaust gas system of an internal combustion engine of the present invention, respectively.

In FIG. 1, reference numeral 20 denotes an engine which is mainly operated under a lean condition. In an exhaust gas system of the engine 20, there are provided an NOx reducing catalyst 30 capable of adsorbing nitrogen oxide (NOx) under a lean atmosphere, and an NOx sensor 40 disposed downstream of the NOx reducing catalyst 30. In this engine exhaust gas system, an air-fuel ratio (A/F) control circuit section 50 detects an output value of the NOx sensor 40 corresponding to an NOx exhaust concentration, and compares the detected value with a predetermined value. When the output value reaches the predetermined value, a fuel injection quantity control section 60 controls a fuel injection quantity based on a signal from the A/F control circuit section 50 so that the air-fuel ratio (A/F) of a mixture supplied to the engine 20 is at a stoichiometric air-fuel or in a rich air-fuel ratio condition. In this way, by executing the control to make the air-fuel ratio (A/F) of a mixture supplied to the engine 20 stoichiometric or rich, NOx adsorbed to the NOx reducing catalyst 30 is detached or decomposed so that the engine 20 can be again operated under the lean condition.

FIG. 2 shows an embodiment in which a fuel is intermittently injected. An injection/cancellation timing judging section 70 detects an output value of the NOx sensor 40 corresponding to an NOx exhaust concentration, and compares the detected value with a predetermined value. When the output value reaches the predetermined value, an injection means 80 injects a fuel upstream of the NOx reducing catalyst 30 based on a signal from the injection/cancellation timing judging section 70. In this way, by injecting the fuel upstream of the NOx reducing catalyst 30, NOx adsorbed to the NOx reducing catalyst 30 is detached or decomposed so that the engine 20 can be again operated under the lean condition.

It should be noted that in an embodiment shown in FIG. 3, instead of the NOx reducing catalyst 30 in FIG. 1, a nitrogen oxide adsorptive material (NOx adsorptive material) 31 and an NOx catalyst 32 arranged downstream thereof are disposed, so that adsorption and decomposition of NOx are carried out at different portions.

Figure 10:
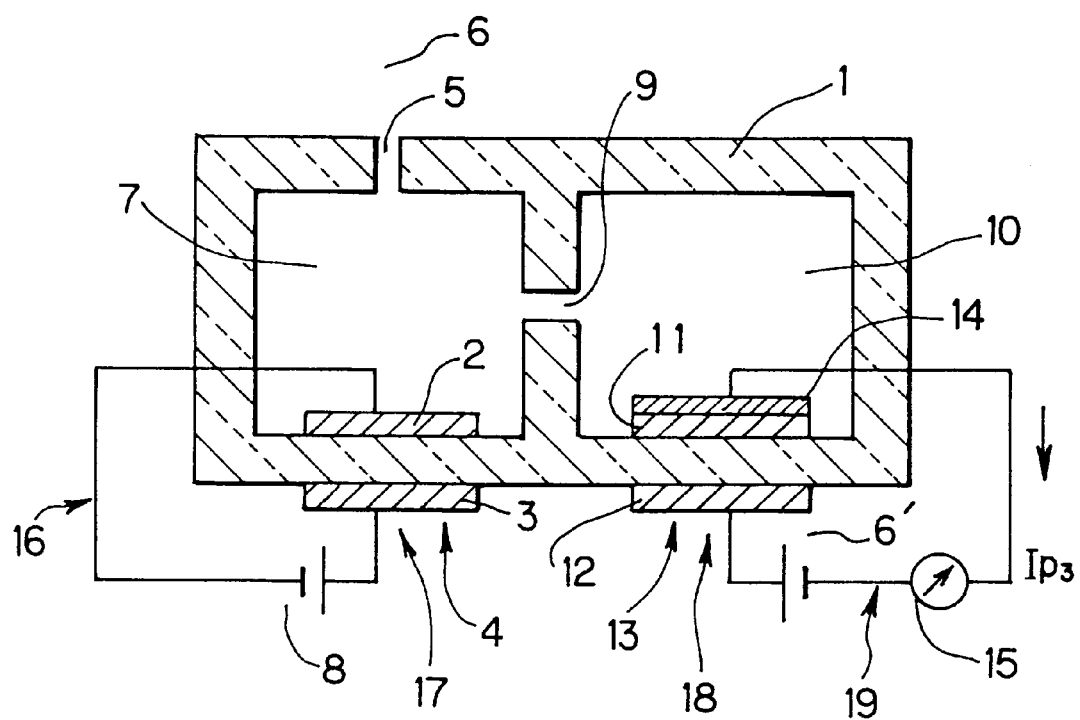
FIG. 10 is an explanatory view showing a basic structure of an example of an NOx sensor used in the present invention.

Here, as the NOx sensor, a sensor less affected by oxygen, hydrogen, carbon monoxide, hydrocarbon, water vapor, carbonic acid gas, or the like coexisting in the exhaust gas of an internal combustion engine, for example, a sensor shown in FIG. 10 and disclosed in European Patent Publication 0678740 A1 is preferable because it is superior in the accuracy of measured values of NOx and the response speed.

The NOx adsorptive material serves to adsorb nitrogen oxide (NOx) in a lean atmosphere and detach NOx in a rich atmosphere.

FIG. 10 shows the basic structure of an NOx sensor preferably used in the present invention and disclosed in European Patent Publication 0678740 A1.

In FIG. 10, an inner pump electrode 2 and an outer pump electrode 3 made of platinum or the like are disposed on both sides of a partition wall 1 made of an oxygen ion conductive solid electrolyte such as zirconia porcelain, so that an electrochemical pump cell 4 is constructed. A main pump means 17 is constructed such that an electric circuit 16 is disposed between the inner pump electrode 2 and the outer pump electrode 3 of the electrochemical pump cell 4 so as to apply a control voltage from a power source 8. In this structure, the atmosphere in a first inner space 7 communicating with a measured gas space 6 through a first diffusion resistive portion 5 is controlled to have a predetermined low oxygen partial pressure within the range in which NO is not substantially decomposed by a first pump current due to the control voltage from the power source 8 applied between the inner pump electrode 2 and the outer pump electrode 3.

The gas in which the oxygen partial pressure is controlled to a constant value is introduced into a second inner space 10 through a second diffusion resistive portion 9. The second inner space 10 contains an electrochemical pump cell 13 formed of the partition wall 1, a detection electrode 11 and a reference electrode 12 disposed on both the surfaces of the partition wall 1, and an electric circuit 19 is disposed between the detection electrode 11 and the reference electrode 12 so that an electric signal conversion means 18 is constructed. Further, a catalyst 14 for accelerating the decomposition of NOx is disposed on the detection electrode 11.

NOx in the gas diffused into the second internal space 10 through the second diffusion resistive portion 9 is decomposed into nitrogen and oxygen by the catalyst 14. The oxygen produced by the reaction is pumped into a reference gas existing space 6' from the detection electrode 11 through the reference electrode 12, and is measured as a current (second pump current) flowing at that time by a current detecting means 15.

Figure 4:
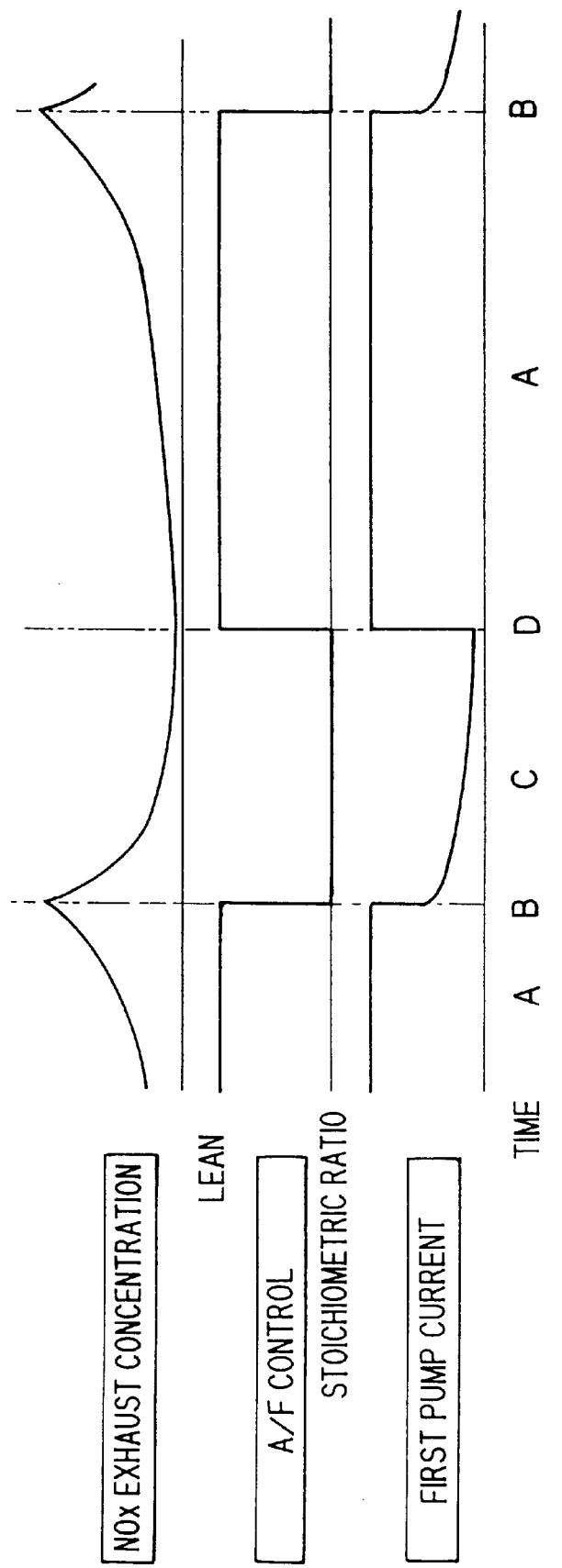
FIG. 4 is a graph showing the relation among an NOx exhaust concentration, an A/F control value, and a first pump current with respect to time in the control method of the present invention shown in FIG. 1.

FIG. 4 shows the relation among, in the case where an NOx exhaust concentration is controlled based on the control method shown in FIG. 1, the NOx exhaust concentration, an A/F control value, and a residual oxygen amount in the exhaust gas, that is, the first pump current of the electrochemical pump cell 4 in the case of using the NOx sensor shown in FIG. 10, with respect to time.

That is, at time A, the A/F control value is in a lean condition, and the adsorptive capacity is lowered as the adsorption of NOx to the NOx adsorptive material progresses, so that the NOx exhaust concentration is gradually increased. At time B when the NOx exhaust concentration reaches a predetermined value, the A/F control value is switched into a stoichiometric condition or a rich condition. At time C, since hydrocarbon and carbon monoxide in the exhaust gas are increased, the adsorbed NOx is decomposed and NOx from the engine is also decreased, so that the NOx exhaust concentration is rapidly decreased. Immediately after time B, the adsorbed NOx reacts with hydrocarbon or carbon monoxide so that the amount of remaining oxygen in the exhaust gas is relatively large and the first pump current is large. However, as the adsorbed NOx is consumed by the reaction, the ratio of reaction of the remaining oxygen with hydrocarbon or carbon monoxide becomes large, so that the amount of remaining oxygen is gradually decreased and the pump current is also decreased with this. At the time when the decrease of the pump current is saturated or the current value becomes a predetermined value, it is judged that almost all the adsorbed NOx is decomposed. Thus, by using this pump current value, using the NOx exhaust concentration itself as a threshold value, or using a time determined in advance as a function of the number of engine rotation, fuel injection quantity, and the like, the A/F control value is again made lean at time D.

Figure 5:
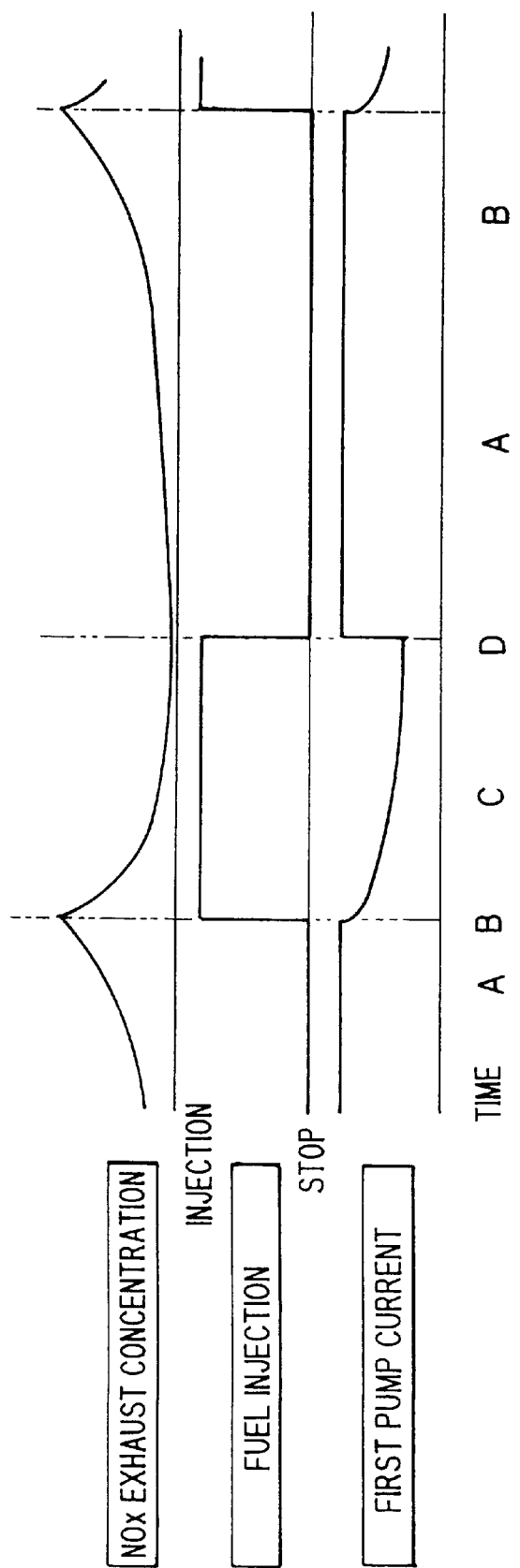
FIG. 5 is a graph showing the relation among an NOx exhaust concentration, an A/F control value, and a first pump current with respect to time in the control method of the present invention shown in FIG. 2.

FIG. 5 shows the relation among, in the case where an NOx exhaust concentration is control led based on the control system shown in FIG. 2, the NOx exhaust concentration, an A/F control value, and a residual oxygen amount in an exhaust gas, that is, the first pump current of the electrochemical pump cell 4 in the case of using the NOx sensor shown in FIG. 10, with respect to time.

That is, at time A, the A/F control value is in a lean condition, and the adsorptive capacity is lowered as the adsorption of NOx to the NOx adsorptive material progresses, so that the NOx exhaust concentration is gradually increased. At time B when the NOx exhaust concentration reaches a predetermined value, the injection of fuel starts. At time C, the adsorbed NOx is decomposed by the injected fuel, and NOx from the engine is also decreased, so that the NOx exhaust concentration is rapidly decreased. Immediately after time B, since the adsorbed NOx reacts with the fuel, the amount of remaining oxygen in the exhaust gas is relatively large and the pump current is large. However, as the adsorbed NOx is consumed by the reaction, the ratio of reaction of the remaining oxygen with hydrocarbon or carbon monoxide in the exhaust gas is increased, so that the amount of remaining oxygen is gradually decreased and the pump current is also decreased with this. At the time when the decrease of pump current is saturated, or the current value becomes a predetermined value, it is judged that almost all the adsorbed NOx is decomposed. Thus, by using the pump current value, or using the NOx exhaust concentration itself as a threshold value, the injection of fuel is again stopped at time D. In the present invention, as the fuel, combustible materials such as petrol, light oil, carbon monoxide, hydrogen, LPG, or alcohol, or gas having NOx reduction properties such as ammonia ($NH_3$) may be used.

More specific embodiments of a control method according to the present invention will next be described.

Figure 6:
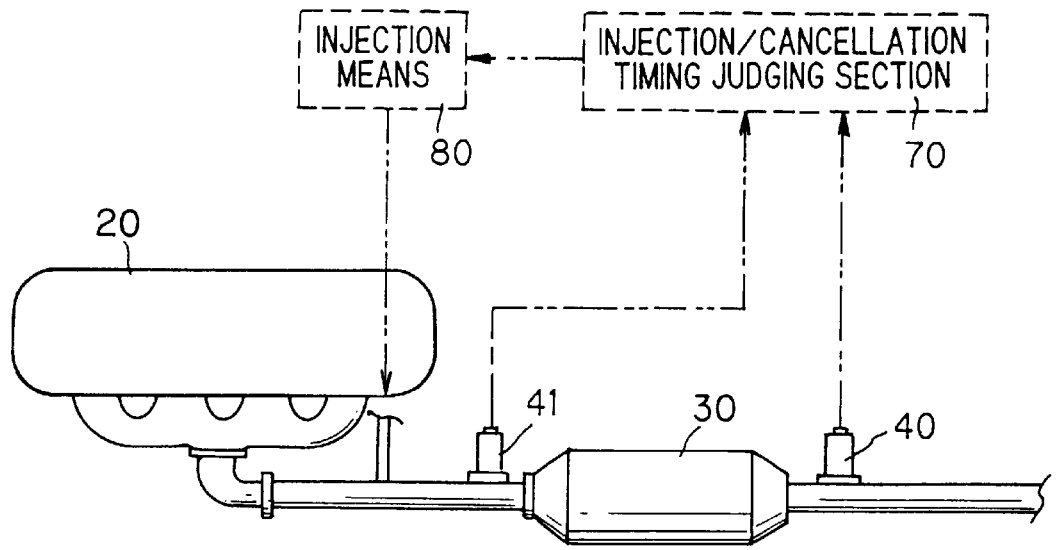
FIG. 6 is an explanatory view showing still another embodiment of a method of controlling an engine exhaust gas system according to the present invention.

FIG. 6 shows a modified embodiment of a control method shown in FIG. 2. NOx sensors 40 and 41 shown in FIG. 10 are respectively disposed at the upstream side and downstream side of an NOx catalyst 30. By comparing the output value of the downstream-side NOx sensor 40 with that of the upstream-side NOx sensor 41, the injection of fuel is controlled. The comparison of the NOx output values is carried out through an indicating value ratio, indicating value deviation, and the like. In FIG. 6, although the fuel injection is controlled, it can be applied in the same way to the case of switching an air-fuel ratio to a stoichiometric air-fuel ratio or a rich air-fuel ratio as shown in FIG. 1.

When the pump current of the electrochemical pump cell 4 of the upstream-side Nox sensor 41 is Ip1, this value corresponds to the remaining amount obtained by subtracting the amount of oxygen required for combustion of hydrocarbon and carbon monoxide from the amount of oxygen in the combustion exhaust gas. On the other hand, when the pump current of the electrochemical pump cell 4 of the downstream-side NOx sensor 40 is Ip2, since hydrocarbon and carbon monoxide react with Nox adsorbed to the NOx catalyst so that the amount of reaction thereof with oxygen is decreased, this value of Ip2 is increased by the amount of oxygen supplied from the NOx adsorbed to the NOx catalyst 30 in comparison with the value of Ip1. It is judged that almost all the adsorbed NOx is consumed at the time when the ratio of the pump currents Ip1/Ip2 or difference of the pump currents Ip1-Ip2 becomes a predetermined value, and the A/F is returned to a lean air-fuel ratio, or the injection of fuel is stopped. This method has a feature that the accuracy of detecting the return timing is high.

Since the time of fuel injection or the period of time for which the A/F is in a stoichiometric condition is also the period of time for which NOx is decreased so that measurement of NOx is not necessary, it is possible to start switching to a lean condition in such a manner that current application to the electrochemical pump cell of the NOx sensor is temporarily suspended to make it function as an oxygen concentration cell, and an electromotive force of the electrochemical pump cell is measured to measure the A/F at the downstream side, whereby the switching to a lean condition is started by this A/F value. Of course, the electromotive force of the oxygen concentration cell may be measured while current is applied to the electrochemical pump cell, and in this case, it is preferable to correct a voltage drop due to the impedance of the pump in accordance with the pump current.

Figure 7:
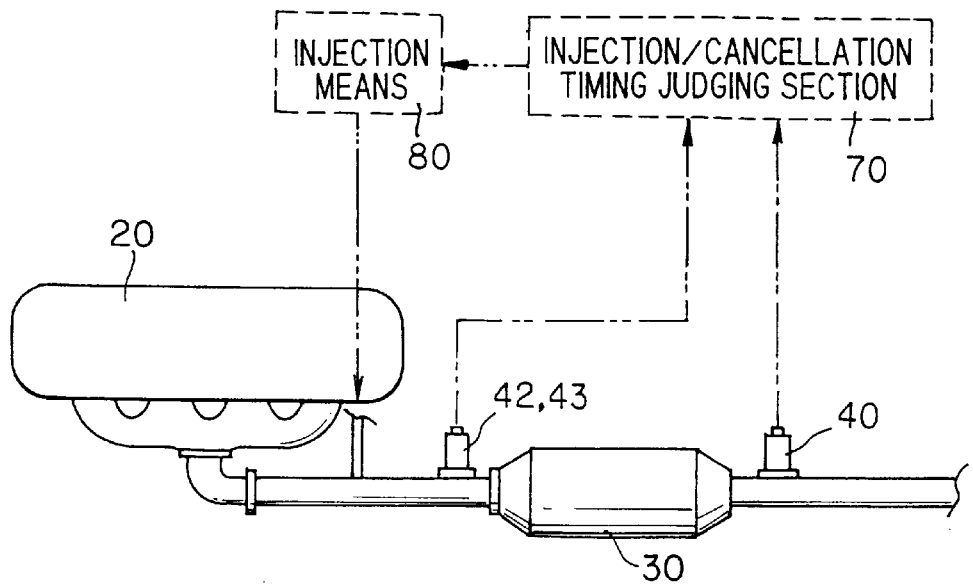
FIG. 7 is an explanatory view showing still another embodiment of a method of controlling an engine exhaust gas system according to the present invention.

FIG. 7 shows a case where an oxygen sensor 42 or a diffusion limit current type A/F sensor 43 is disposed at the upstream side of the NOx catalyst 30. In the case where the oxygen sensor 42 at the upstream side is used, since the A/F value controlled by the oxygen sensor 42 is a constant value, this value is compared with the A/F measured value by the NOx sensor 40 disposed at the downstream side. At this time, it is preferable that current application to the electrochemical pump cell 13 of the NOx sensor 40 is temporarily suspended, the oxygen partial pressure in the first inner space 7 of the NOx sensor 40 is controlled to have a value at which NOx is decomposed, and the A/F is obtained by the pump current value at that time. Apart from this, current application to the electrochemical pump cell 13 of the NOx sensor 40 at the downstream side may be suspended to make it function as an oxygen concentration cell. In this case, when the electromotive force of the oxygen sensor 42 at the upstream side is V1, and the electromotive force of the oxygen sensor at the downstream side is V2, reduction of the adsorbed NOx is ended at the time when V1 equals to V2. Thus, in case that the difference between V1 and V2 or the ratio thereof exceeds a predetermined value, the injection of fuel is stopped or the A/F is returned to, a lean air-fuel ratio condition.

On the other hand, in the case that the diffusion limit current type A/F sensor is used at the upstream side, the output value of the A/F sensor 43 is compared with the A/F measurement value due to the pump current value of the first inner space 7 of the NOx sensor 40 disposed at the downstream side. Also in this case, it is preferable that current application to the electrochemical pump cell 13 of the NOx sensor 40 is temporarily suspended and the oxygen partial pressure in the first inner space 7 of the NOx sensor 40 is controlled to have a value at which NOx is decomposed.

Figure 8:
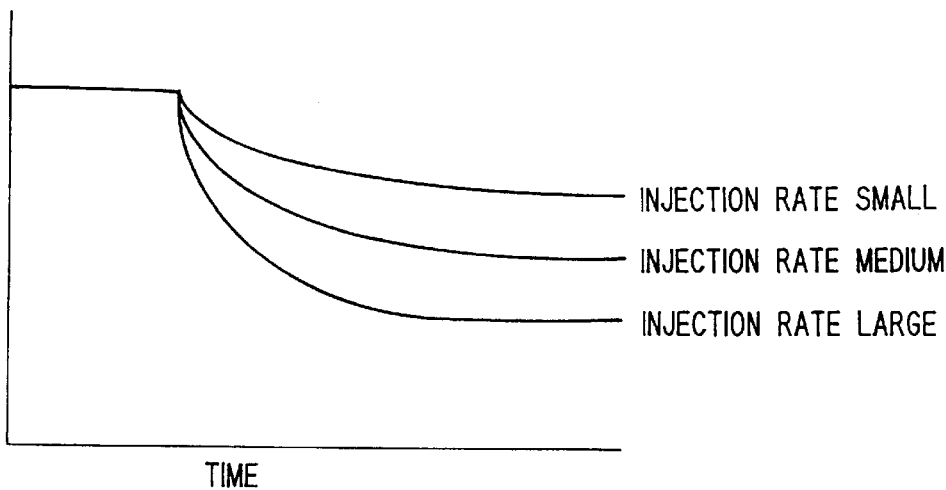
FIG. 8 is a graph showing the variation rate of a first pump current for fuel injection quantities.

The judgement of switch timing into a lean state may also be carried out by an A/F change speed (change speed of the pump current of the electrochemical pump cell 4 of the NOx sensor 40). That is, since the pump current of the electrochemical pump cell 4 of the NOx sensor 40 changes for the respective fuel injection quantities along attenuation curves as shown in FIG. 8, it can be judged that the time when the attenuation speed becomes slow and exceeds a predetermined value, is the timing of switching into a lean condition.

Further, the indicated value of the A/F sensor 43 at the upstream side corresponds to the concentration of remaining oxygen after reaction of oxygen in the exhaust gas with the fuel, while the pump current of the electrochemical pump cell 4 of the NOx sensor 40 indicates the remaining oxygen concentration after reaction of oxygen with the fuel and adsorbed NOx, and the difference thereof indicates the decomposition amount of the adsorbed NOx. Thus, the switch timing into a lean condition may be judged in such a manner that the NOx decomposition amount is obtained from the difference between the pump current value of the electrochemical pump cell 4 of the NOx sensor 40 and an objective pump current value given from an indicated value of the A/F sensor 43 at the upstream side (that is, decomposition amount of adsorbed NOx), and the exhaust gas flow amount, this amount is integrated, and the time when this value becomes a predetermined value is the switch timing into a lean condition. The integrated value may be converted to a weight value of NOx to be used.

The judgement of switch timing from a lean condition to a stoichiometric condition, a rich condition, or fuel injection may be carried out through an integral value of the NOx sensor output, or through a differential value thereof. In the period when an internal combustion engine is operated in a lean condition, even if an operation condition is slightly changed, the concentration of NOx is hardly affected. Thus, since rapid increase of the NOx concentration due to saturation of NOx adsorption can be relatively easily detected, the judgement can be sufficiently made even by a differential value of the NOx sensor output.

Also, it is preferable, in view of adaptation to exhaust gas regulations, to execute the switching in such a manner that the information of an exhaust gas flow amount and a running distance is added to the information of NOx concentration to change it into the information of NOx exhaust amount (gram/mile), and when this value or an integral value thereof becomes a predetermined value, the switching is executed.

A method of detecting the deterioration of a catalyst/adsorbing means according to the present invention will next be described.

This detection method uses the fact that, in the above described engine exhaust gas system including the NOx sensor, a period of time required for adsorbing, detaching, or decomposing NOx, or a repetition period of these depends on the adsorptive capacity of an NOx reducing catalyst, and it is judged that the NOx reducing catalyst is deteriorated at the time when the period of time of a lean condition, period of time of a rich or stoichiometric condition, or the repetition period becomes shorter than a predetermined time.

That is, when the adsorptive capacity of the NOx reducing catalyst is decreased, the adsorption of NOx exhausted from the internal combustion engine in a lean period to the NOx reducing catalyst is saturated in a short time, and NOx flown to the downstream side of the NOx reducing catalyst starts to increase soon. Thus, the switching from a lean condition to a rich or stoichiometric condition is promptly carried out. Thus, the lean condition is monitored and when it becomes less than a predetermined time, it is judged that the NOx reducing catalyst is deteriorated.

Figure 9:
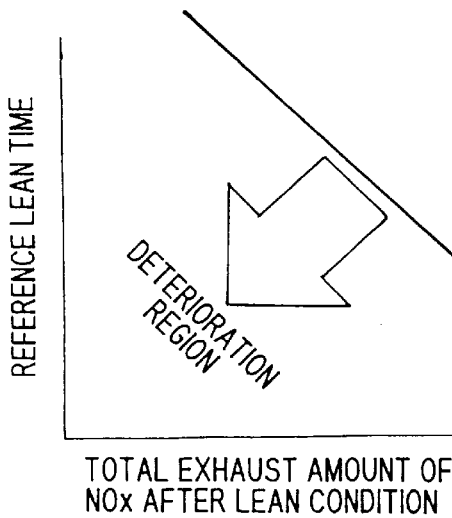
FIG. 9 is a graph showing the relation between the total exhaust amount of NOx and reference lean time.

Since the amount of flowing exhaust gas or the NOx concentration is changed by operation conditions of an internal combustion engine, for example, the number of rotation or an A/F value, the above described switching time and the period is required to be normalized by adding the information. For example, as shown in FIG. 9, based on the operation condition of the internal combustion engine, the NOx exhaust amount after a lean state is calculated, the lower limit value of a lean period corresponding to the value of the exhaust amount is set and is compared with an actual lean period Also, based on the operation conditions of the internal combustion engine, the amount of NOx after a lean condition is integrated to obtain the total exhaust amount, and the switching time required to achieve a predetermined total exhaust amount may be compared with a predetermined standard time.

The rich, stoichiometric, or fuel injection period is also a typical value for the adsorbed NOx amount. The deterioration of adsorptive capacity of the NOx reducing catalyst can be judged by this time. Also in this case, the deterioration is judged in such a manner that, similar to the abovementioned case of a lean condition, a time corresponding to the exhaust amount of NOx or the total exhaust amount is set in advance based on the operation conditions of the internal combustion engine, and is compared with an actual period.

In the case where the NOx sensors are disposed at both the upstream side and downstream side of the NOx reducing catalyst, the amount of NOx adsorbed to the NOx reducing catalyst is obtained from the information of the difference between the output of the upstream-side NOx sensor and the output of the downstream-side NOx and the amount of gas flow, and if the adsorption amount immediately after switching from a lean condition or after the lapse of a predetermined time is less than a predetermined value, the case may be judged to be deteriorated. Instead of the adsorption amount, if the ratio of concentrations of NOx at the upstream side and the downstream side of the NOx reducing catalyst ("NOx concentration at the upstream side"/"NOx concentration at downstream side") becomes less than a predetermined value, such a case may be judged to be deteriorated.

Incidentally, although the foregoing description is made with respect to the NOx reducing catalyst, the present invention can also be applied to the NOx adsorptive material, and the deterioration of the NOx adsorptive material can also be detected.

As is apparent from the above description, according to the method of the present invention, by effectively using the capacity of the NOx reducing catalyst or NOx adsorptive material, it is possible to treat NOx in the exhaust gas of an internal combustion engine to an extremely low concentration, and further it is also possible to exactly detect the deterioration of the NOx reducing catalyst or NOx adsorptive material, thus the invention is extremely useful in industry.

What is claimed is:

1. A method of controlling an exhaust gas system of an internal combustion engine which operates mainly under a lean condition, which system comprises a nitrogen oxide reducing catalyst capable of adsorbing nitrogen oxide under a lean atmosphere and a nitrogen oxide sensor disposed downstream of the nitrogen oxide reducing catalyst; said method comprising the steps of:

(a) switching temporarily the operation condition of said internal combustion engine into a stoichiometric condition or a rich condition so that the nitrogen oxide adsorbed to said nitrogen oxide reducing catalyst is detached or decomposed when an output of the nitrogen oxide sensor reaches a predetermined level, (b) returning the operational condition back to a lean condition when an electromotive force, or a pumping current of a first pumping cell, of the nitrogen oxide sensor reaches a predetermined level.

2. A method of controlling an exhaust gas system of an internal combustion engine which operates mainly under a lean condition, which system comprises a nitrogen oxide reducing catalyst capable of adsorbing nitrogen oxide under a lean atmosphere and a nitrogen oxide sensor disposed downstream of the nitrogen oxide reducing catalyst; said method comprising the steps of:

(a) injecting a fuel upstream of said nitrogen oxide reducing catalyst so that the nitrogen oxide adsorbed to said nitrogen oxide reducing catalyst is detached or decomposed when an output of the nitrogen oxide sensor reaches a predetermined level, and (b) returning the operational condition back to a lean condition when an electromotive force, or a pumping current of a first pumping cell, of the nitrogen oxide sensor reaches a predetermined level.

3. A method of detecting deterioration of a catalyst usable for an exhaust gas system of an internal combustion engine which operates mainly under a lean condition; said system comprising a nitrogen oxide reducing catalyst capable of adsorbing nitrogen oxide under a lean atmosphere and a nitrogen oxide sensor disposed downstream of the nitrogen oxide reducing catalyst characterized in that deterioration of the catalyst is detected based on a length of a period between the step (a) and the step (b) in claim 1.

4. A method of detecting deterioration of a catalyst usable for an exhaust gas system of an internal combustion engine which operates mainly under a lean condition; said system comprising a nitrogen oxide reducing catalyst capable of adsorbing nitrogen oxide under a lean atmosphere and a nitrogen oxide sensor disposed downstream of the nitrogen oxide reducing catalyst characterized in that deterioration of the catalyst is detected based on a length of a period between the step (a) and the step (b) in claim 2.

5. A method of detecting deterioration of a catalyst/adsorption means, usable for an exhaust gas system of an internal combustion engine which operates mainly under a lean condition; said system comprising a nitrogen oxide reducing catalyst capable of adsorbing nitrogen oxide under a lean atmosphere and a nitrogen oxide sensor disposed downstream of the nitrogen oxide reducing catalyst, characterized in that deterioration of the catalyst is detected based on a length of a period between the step (a) and the step (b) in claim 1.

6. A method of detecting deterioration of a catalyst/adsorption means, usable for an exhaust gas system of an internal combustion engine which operates mainly under a lean condition; said system comprising a nitrogen oxide reducing catalyst capable of adsorbing nitrogen oxide under a lean atmosphere and a nitrogen oxide sensor disposed downstream of the nitrogen oxide reducing catalyst, characterized in that deterioration of the catalyst is detected based on a length of a period between the step (a) and the step (b) in claim 2.

\* \* \* \* \*